United States Patent
Youk et al.

(10) Patent No.: US 9,617,364 B2
(45) Date of Patent: Apr. 11, 2017

(54) VINYL CHLORIDE POLYMER AND PREPARATION METHOD THEREOF

(71) Applicant: LG CHEM, LTD., Seoul (KR)

(72) Inventors: Kyung Seog Youk, Daejeon (KR); Kyung Hyun Kim, Daejeon (KR); Hyun Min Lee, Daejeon (KR); Yong Jin Kim, Daejeon (KR); Heung Kwon Bae, Daejeon (KR); Jung Rae Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/111,407

(22) PCT Filed: Sep. 14, 2015

(86) PCT No.: PCT/KR2015/009643
§ 371 (c)(1),
(2) Date: Jul. 13, 2016

(87) PCT Pub. No.: WO2016/047954
PCT Pub. Date: Mar. 31, 2016

(65) Prior Publication Data
US 2016/0340452 A1   Nov. 24, 2016

(30) Foreign Application Priority Data

Sep. 23, 2014   (KR) .................. 10-2014-0127051

(51) Int. Cl.
C08F 14/06   (2006.01)
C08F 114/06   (2006.01)
C08F 2/18   (2006.01)
C08F 2/44   (2006.01)
C08F 6/24   (2006.01)

(52) U.S. Cl.
CPC .............. *C08F 114/06* (2013.01); *C08F 2/18* (2013.01); *C08F 2/44* (2013.01); *C08F 6/24* (2013.01); *C08F 14/06* (2013.01)

(58) Field of Classification Search
CPC  C08F 14/06; C08F 2/18; C08F 114/06; C08F 6/24; C08F 2/44
USPC ................................... 526/344, 344.2, 344.3
See application file for complete search history.

(56) References Cited

U.S. PATENT DOCUMENTS

| | | |
|---|---|---|
| 4,526,946 A | 7/1985 | Fitzpatrick et al. |
| 5,376,747 A | 12/1994 | Shigemitsu et al. |
| 2001/0004658 A1 | 6/2001 | Stieneker et al. |
| 2005/0197476 A1 | 9/2005 | Ooura et al. |
| 2011/0004658 A1 | 1/2011 | Chesley et al. |
| 2012/0095176 A1* | 4/2012 | Hiermeier ............... C08F 14/06 526/199 |

FOREIGN PATENT DOCUMENTS

| | | |
|---|---|---|
| JP | H07238104 A | 9/1995 |
| JP | 2002-302503 A | 10/2002 |
| JP | 2007119764 A | 5/2007 |
| KR | 10-2001-0062169 A | 7/2001 |
| KR | 10-2011-0006224 A | 1/2011 |
| KR | 10-2012-0007227 A | 1/2012 |

* cited by examiner

*Primary Examiner* — William Cheung
(74) *Attorney, Agent, or Firm* — Dentons US LLP

(57) ABSTRACT

The present invention relates to a method of preparing a vinyl chloride polymer having good thermal stability due to the restraint of dehydrochlorination by heat or ultraviolet rays, and a vinyl chloride polymer prepared thereby. In the preparation method, a modifier is introduced at the end of a polymerization process to impart the vinyl chloride polymer with high thermal stability without inducing modification. Therefore, the generation of dehydrochlorination due to heat or ultraviolet rays may be markedly restrained, thermal stability may be improved, and discoloration or the modification of physical properties may be prevented in the vinyl chloride polymer thus prepared.

12 Claims, No Drawings

VINYL CHLORIDE POLYMER AND PREPARATION METHOD THEREOF

CROSS-REFERENCE TO RELATED APPLICATIONS

This application is a National Stage Entry of International Application No. PCT/KR2015/009643, filed on Sep. 14, 2015, and claims the benefit of and priority to Korean Application No. 10-2014-0127051, filed on Sep. 23, 2014, all of which are hereby incorporated by reference in their entirety for all purposes as if fully set forth herein.

TECHNICAL FIELD

The present invention relates to a vinyl chloride polymer having good thermal stability due to the restraint of dehydrochlorination by heat or ultraviolet rays, and a method of preparing the same.

BACKGROUND ART

A vinyl chloride polymer is a polymer including 50% or more of vinyl chloride, is cheap, allows easy control of hardness, is applicable in most processing equipments and has diverse application fields. In addition, the vinyl chloride polymer may provide a molded product having good physical and chemical properties such as mechanical strength, climate resistance and chemical resistance, and is widely used in diverse fields.

However, the vinyl chloride polymer may induce dehydrochlorination due to the defects of chemical structures, generated during a polymerization reaction by heat or ultraviolet rays applied during processing and may induce the discoloration of a resin or the deterioration of physical properties.

Particularly, in a vinyl chloride polymer, chemical defects generated during a polymerization reaction, i.e., the defects of the chemical structures of allyl chloride and tertiary chloride are present. Due to the defects of the chemical structure, the binding energy of carbon with chlorine in the vinyl chloride polymer may be much lower than that of carbon with chlorine in a normal molecular structure, and the bonding between carbon and chlorine may be easily broken due to external radical transfer during processing the vinyl chloride polymer. Separated hydrogen chloride from a polymer chain accelerates other side reactions through an auto-catalyst reaction to produce another hydrogen chloride continuously. In addition, a double bond may be formed at the site from where the hydrogen chloride has been removed, and a number of double bonds may be overlapped to generate the discoloration of a resin and the deterioration of physical properties. That is, in a vinyl chloride polymer or a molded product processed therefrom, a dehydrochlorination reaction may be generated due to heat or ultraviolet rays, thereby generating the discoloration defects of a vinyl chloride polymer or the deterioration or change of physical properties.

In order to improve the limitations of the vinyl chloride polymer, an organometallic compound containing a metal such as Ba, Zn, Ca and Pb has been mixed with the vinyl chloride polymer to restrain the generation of radicals or ions during thermal decomposition of the vinyl chloride polymer and to control the thermal decomposition rate of a resin. Recently, a method of using a thermal stabilizer of diverse types such as a metallic material or an organic compound has been introduced. However, the use thereof is limited due to environmental problems caused by the use of a heavy metal stabilizer and high price.

A method of blending a polymer having good heat resistance with a vinyl chloride polymer has been suggested to complement weak physical properties however is not easily used due to low miscibility with the vinyl chloride polymer and difficulty in processing.

With such a background, the inventors of the present disclosure studied on a method of improving the thermal stability of a vinyl chloride polymer by effectively restraining a dehydrochlorination reaction (a dehydrochloric acid reaction), prepared a vinyl chloride polymer by adding at least one modifier of oxycarboxylates, inorganic phosphates or ethylenediamine tetraacetates to a vinyl chloride monomer, and suspension polymerizing, measured the generation degree of scale, the amount of dehydrochloric acid and thermal stability (Blackening Index), found that the generation degree of the scale is extremely small, the amount of dehydrochloric acid is decreased, and the thermal stability (Blackening Index) is improved, and achieved the present invention.

DISCLOSURE OF THE INVENTION

Technical Problem

The present invention provides a method of preparing a vinyl chloride polymer via suspension polymerization, having improved thermal stability by restraining the dehydrochlorination reaction of a vinyl chloride polymer due to heat or ultraviolet rays.

The present invention also provides a vinyl chloride polymer prepared by the preparation method via suspension polymerization.

Technical Solution

According to an aspect of the present invention, there is provided a method of preparing a vinyl chloride polymer characterized in including adding 100 parts by weight of a vinyl chloride monomer to a reactor filled with 0.01 to 5 parts by weight of a dispersant, and suspension polymerizing at a temperature from 30° C. to 70° C., wherein 0.001 to 10 parts by weight of a modifier is added at a point when a polymerization conversion ratio is 80% or more during suspension polymerizing.

According to another aspect of the present invention, there is provided a vinyl chloride polymer prepared by the preparation method using suspension polymerization.

Effects of the Invention

According to the vinyl chloride polymer of the present invention, the generation degree of scale may be markedly decreased, the generation of dehydrochlorination due to heat or ultraviolet rays may be markedly restrained, thermal stability may be improved, and discoloration or the modification of physical properties may be prevented.

In the method of preparing a vinyl chloride polymer via suspension polymerization according to the present invention, a modifier is introduced at the end of the polymerization, and the vinyl chloride polymer may be imparted with high thermal stability without generating modification.

Accordingly, the vinyl chloride polymer and the method of preparing thereof via suspension polymerization may be readily applied to an industry requiring the vinyl chloride polymer, for example, industries concerning a vinyl chloride resin and the molded product thereof.

BEST MODE FOR CARRYING OUT THE INVENTION

Hereinafter, the present invention will be explained in more detail to assist the understanding of the present invention.

It will be further understood that terms or words used in the description and claims should not be interpreted as having a meaning such as those defined in commonly used dictionaries, however should be interpreted as having a meaning and concept that is consistent with the technical spirit of the present invention on the basis of a principle that an inventor may define the concept of terms appropriately to explain his invention by the best way.

The present invention provides a method of preparing a vinyl chloride polymer having short reaction time, and good productivity, economic efficiency, and thermal stability via suspension polymerization, and a vinyl chloride polymer prepared thereby.

The method of preparing a vinyl chloride polymer via suspension polymerization according to an embodiment of the present invention is characterized in including adding 100 parts by weight of a vinyl chloride monomer to a reactor filled with 0.01 to 10 parts by weight of a dispersant, and conducting suspension polymerization at a temperature within a range from 30° C. to 70° C., and in adding 0.001 to 10 parts by weight of a modifier at a point when a polymerization conversion ratio is 80% or more during the suspension polymerization.

Particularly, the suspension polymerization according to the present invention may be conducted by adding 100 parts by weight of a vinyl chloride monomer to a reactor filled with 0.01 to 10 parts by weight of a dispersant as described above. The expression of "reactor filled with" means a reactor in which a dispersant is added before conducting a polymerization reaction. A protective colloid and a polymerization initiator may be added together with the dispersant as occasion demands.

The vinyl chloride monomer may be a pure vinyl chloride monomer or a mixture of the vinyl chloride monomer with a vinyl monomer copolymerizable with the vinyl chloride monomer.

The vinyl chloride monomer may include a polymer formed using only pure vinyl chloride monomer, or a copolymer of a vinyl chloride monomer as a main component with a vinyl monomer copolymerizable with the vinyl chloride monomer. For the copolymer of the vinyl chloride monomer with the vinyl monomer copolymerizable with the vinyl chloride monomer, the vinyl chloride may preferably be included in the copolymer in a ratio of 50% or more.

The vinyl monomer copolymerizable with the vinyl chloride monomer is not specifically limited, however may include an olefin compound such as ethylene, propylene, and butane, vinyl esters such as vinyl acetate, vinyl propionate, and vinyl stearate, unsaturated nitriles such as acrylonitrile, vinyl alkyl ethers such as vinyl methyl ether, vinyl ethyl ether, vinyl octyl ether, and vinyl lauryl ether, vinylidene halide such as vinylidene chloride, unsaturated fatty acid such as acrylic acid, methacrylic acid, itaconic acid, maleic acid, fumaric acid, maleic anhydride, and itaconic anhydride, and anhydrides of the fatty acid, unsaturated fatty acid esters such as methyl acrylate, ethyl acrylate, monomethyl maleate, dimethyl maleate, and butylbenzyl maleate, a crosslinking monomer such as diallyl phthalate. The vinyl monomers may be used alone or as a mixture of two or more.

The protective colloid stabilizes reactants during polymerizing a vinyl chloride resin and functions to produce uniform and stable particles, and the amount ratio added may be from 0.001 to 5 parts by weight relative to 100 parts by weight of the vinyl chloride monomer.

The protective colloid may be at least one selected from the group consisting of a vinyl alcohol resin having the degree of hydration from 30 wt % to 98 wt %, and the viscosity thereof in a 4% aqueous solution state at 25° C. from 5 cps to 100 cps; cellulose including from 15 wt % to 40 wt % of a methoxy group, from 3 wt % to 20 wt % of a hydroxypropyl group, and the viscosity thereof in a 2% aqueous solution state at 25° C. from 10 cps to 20,000 cps; and an unsaturated organic acid.

The polymerization initiator may be used in an amount ratio from 0.0001 to 0.5 parts by weight relative to 100 parts by weight of the vinyl chloride monomer, and may use at least one selected from the group consisting of diacylperoxides, peroxydicarbonates, peroxy esters, azo compounds, and sulfates.

The suspension polymerization may be conducted at a temperature from 30° C. to 70° C. as described above, and the temperature during the suspension polymerization may be appropriately controlled within the above range according to the desired degree of polymerization. For example, the temperature may decrease according to the increase of the desired degree of polymerization, and the temperature may increase according to the decrease of the degree of polymerization.

In addition, the suspension polymerization may be conducted while stirring, and the stirring may be controlled to a rotation rate from 50 rpm to 200 rpm using a stirrer. The stirrer is not specifically limited, however commonly known stirrer in the art may be used. For example, a stirrer having a stirring wing of a paddle type, a pitched paddle type, a bloomersgin type, a pfaudler type, a turbine type, or a propeller type may be used.

In addition, the preparation method of the present invention includes an adding step of a modifier at a point when a polymerization conversion ratio is 80% or more, and the modifier may play the role of restraining the dehydrochlorination reaction of the vinyl chloride polymer and as a result, increasing the thermal stability of the vinyl chloride polymer. The modifier may be appropriately added at a point when a polymerization conversion ratio is 80% or more, and preferably, from 80% to 95%. If the modifier is added at the point when a polymerization conversion ratio is less than 80%, the polymerization reaction may be inhibited due to a weakly basic modifier, the reaction time may be increased, and the generation of scale may be increased. On the contrary, if the modifier is added at a point when a polymerization conversion ratio is 80% or more, the polymerization of the reactants including the vinyl chloride monomer may be almost proceed. Thus, the reaction time may be decreased, and the modifier may be added without generating the modification of the vinyl chloride polymer finally produced. Accordingly, the dehydrochlorination reaction generated due to the exposure of the vinyl chloride polymer to heat or ultraviolet rays may be restrained, and the thermal stability of the vinyl chloride polymer may be markedly improved. In addition, the discoloration of the vinyl chloride polymer due to heat or ultraviolet rays may be prevented. The modifier may be used in an amount ratio from 0.001 to 10 parts by weight relative to 100 parts by weight of the vinyl chloride monomer, and the amount may change according to the kind of the modifier.

The expression of "polymerization conversion ratio" used in the present invention means the polymerization conversion ratio of the vinyl chloride monomer and may be measured using a butane tracer equipped with a gas chromatograph. Particularly, a polymerization conversion ratio curve according to the ratio of a vinyl chloride monomer and butane relative to time under certain polymerization conditions may be formed for each polymerization condition, and polymerization conversion ratio according to polymerization conditions may be measured relative to the curve. In addition, the polymerization conversion ratio may include an error range accompanied with the measurement, for example, 80% may include 80±5%.

Particularly, the modifier may be at least one selected from the group consisting of oxycarboxylates, inorganic phosphates and ethylenediamine tetraacetates.

The oxycarboxylate is not specifically limited, however may be citric acid or trisodium citrate. In the case where the modifier is the oxycarboxylate, the oxycarboxylate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the oxycarboxylate is less than 0.001 parts by weight, the restraining effect of a dehydrochlorination reaction may be trivial, and the improving effect of the thermal stability of the vinyl chloride polymer may be deteriorated, and if the amount of the oxycarboxylate is greater than 10 parts by weight, the processability of the vinyl chloride polymer including thereof may be deteriorated, and the coloring property of a molded article therefrom may be deteriorated.

The inorganic phosphate is not specifically limited, however may be disodium diphosphate or tetrasodium diphosphate, and may particularly be the tetrasodium diphosphate. In the case where the modifier is the inorganic phosphate, the inorganic phosphate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the inorganic phosphate is less than 0.001 parts by weight, the restraining effect of a dehydrochlorination reaction may be trivial, and the improving effect of the thermal stability of the vinyl chloride polymer may be deteriorated, and if the amount of the inorganic phosphate is greater than 10 parts by weight, the processability of the vinyl chloride polymer including thereof may be deteriorated, and the coloring property of a molded article therefrom may be deteriorated.

The ethylenediamine tetraacetate is not specifically limited, however may be disodium ethylenediamine tetraacetic acid or tetrasodium ethylenediamine tetraacetic acid, and may particularly be the tetrasodium ethylenediamine tetraacetic acid. In the case where the modifier is the ethylenediamine tetraacetate, the ethylenediamine tetraacetate may be included in an appropriate amount ratio within a range from 0.001 to 10 parts by weight and may preferably be included in an amount ratio from 0.001 to 1 parts by weight relative to 100 parts by weight of the vinyl chloride monomer as described above. If the amount of the ethylenediamine tetraacetate is less than 0.001 parts by weight, the restraining effect of a dehydrochlorination reaction may be trivial, and the improving effect of the thermal stability of the vinyl chloride polymer may be deteriorated, and if the amount of the ethylenediamine tetraacetate is greater than 10 parts by weight, the processability of the vinyl chloride polymer including thereof may be deteriorated, and the coloring property of a molded article therefrom may be deteriorated.

The polymerization process of the suspension polymerization may be terminated by adding a reaction terminator, and the termination time may be the point when the pressure in the reactor may be from 6 kg/cm$^2$ to 8 kg/cm$^2$ (or the point when a polymerization conversion ratio is greater than 95%).

The reaction terminator is not specifically limited and commonly known materials in the art may be used. For example, a phenol compound, an amine compound, a nitrile compound, or a sulfur compound may be used. Particularly, the reaction terminator may be at least one selected from the group consisting of a phenol compound such as triethylene glycol-bis-3-(3-t-butyl-4-hydroxy-5-methylphenyl)propionate, hydroquinone, p-methoxyphenol, t-butylhydroxyanisole, n-octadecyl-3-(4-hydroxy-3,5-di-t-butylphenyl)propionate, 2,5-di-t-butyl hydroquinone, 4,4'-butylidenebis(3-methyl-6-t-butyl phenol), t-butyl catechol, 4,4'-thiobis(6-t-butyl-m-cresol), and tocopherol; an amine compound such as N,N'-diphenyl-p-phenylenediamine, and 4,4'-bis(dimethylbenzyl)diphenylamine; a nitrile compound such as 2-phenyl nitronylnitroxide, 3-imidazoline nitroxide, and 4-hydroxy-2,2',6,6'-tetramethyl-piperidine-1-oxyl; and a sulfur compound such as dodecyl mercaptane, and 1,2-diphenyl-2-thiol.

In addition, an additive such as a polymerization controller, a chain transfer agent, a pH controller, an antioxidant, a cross-linking agent, an antistatic agent, a scale inhibitor, and a surfactant other than the above-described effective components may be added during suspension polymerizing according to the need, and the kind and the amount of the additive are not specifically limited, however commonly known kinds and amounts in the art may be applied. The additive may be added at any time at the beginning, of during or after suspension polymerizing, and may be added at once or continuously.

The preparation method according to the present invention may additionally include a drying step after suspension polymerizing, and the drying is not specifically limited, and commonly known methods in the art may be applied.

Also, there is provided a vinyl chloride polymer prepared by the preparation method via suspension polymerization in the present invention.

The vinyl chloride polymer according to an embodiment of the present invention has an average particle diameter from 120 μm to 180 μm.

Hereinafter, the present invention will be explained in more detail referring to the following examples and experimental examples. However, the examples and the experimental examples are for illustrating the present invention, and the scope of the present invention is not limited thereto.

Example 1

130 parts by weight (390 kg) of polymerization water, 0.05 parts by weight of polyvinyl alcohol with a hydration degree of 88%, 0.02 parts by weight of polyvinyl alcohol with a hydration degree of 72%, 0.015 parts by weight of polyvinyl alcohol with a hydration degree of 55%, 0.005 parts by weight of hydroxypropyl methyl cellulose, and 0.088 parts by weight of t-butylperoxy neodecanoate (BND) were injected to a stainless polymerization reactor with an inner volume of 1 m$^3$, equipped with a refluxing condenser and a stirrer, followed by stirring and degassing the interior of the reactor using a vacuum pump. 100 parts by weight (300 kg) of a vinyl chloride monomer was injected to the reactor, followed by conducting the reaction while maintaining the inner temperature of the reactor to 57.2° C. 0.1 parts by weight of tetrasodium diphosphate (TSDP) was injected at a point when a polymerization conversion ratio was 80% and stirred for 30 minutes to be introduced to the reaction. Then, the polymerization was ended at a point when the pressure of the polymerization reactor was changed by 1.0 kg/cm². 0.05 parts by weight of triethylene glycol bis-[3-(3-t-butyl-5-methyl-4-hydroxyphenyl)propionate] was added thereto as an antioxidant, and unreacted vinyl chloride monomer was recovered and removed to obtain a vinyl chloride polymer. In this case, the amounts used of the materials in the reaction were represented as relative amounts to 100 parts by weight of the vinyl chloride monomer.

Example 2

A vinyl chloride polymer was obtained by conducting the same procedure described in Example 1 except for injecting 0.1 parts by weight of tetrasodium ethylenediamine tetraacetate (EDTA-4Na) instead of tetrasodium diphosphate (TSDP).

Example 3

A vinyl chloride polymer was obtained by conducting the same procedure described in Example 1 except for injecting 0.1 parts by weight of trisodium citrate instead of tetrasodium diphosphate (TSDP).

Comparative Example 1

A vinyl chloride polymer was obtained by conducting the same procedure described in Example 1 except for not injecting tetrasodium diphosphate (TSDP).

Comparative Example 2

A vinyl chloride polymer was obtained by conducting the same procedure described in Example 1 except for injecting tetrasodium diphosphate (TSDP) not at a point when a polymerization conversion ratio was 80% but prior to initiating polymerization together with a vinyl chloride monomer.

Comparative Example 3

A vinyl chloride polymer was obtained by conducting the same procedure described in Example 1 except for injecting tetrasodium diphosphate (TSDP) not at a point when a polymerization conversion ratio was 80% but at a point when a polymerization conversion ratio was 30%.

Comparative Example 4

A vinyl chloride polymer was obtained by conducting the same procedure described in Example 2 except for injecting tetrasodium ethylenediamine tetraacetate (EDTA-4Na) not at a point when a polymerization conversion ratio was 80% but at a point when a polymerization conversion ratio was 30%.

Comparative Example 5

A vinyl chloride polymer was obtained by conducting the same procedure described in Example 3 except for injecting trisodium citrate not at a point when a polymerization conversion ratio was 80% but at a point when a polymerization conversion ratio was 30%.

Experimental Example

Physical properties of vinyl chloride polymers prepared in Examples 1 to 3 and Comparative Examples 1 to 5 were measured, compared and analyzed, and the results are shown in the following Table 1.

1) Thermal Stability

The thermal stability of each vinyl chloride polymer prepared in Examples 1 to 3 and Comparative Examples 1 to 5 were compared and analyzed. Heat was applied to each vinyl chloride polymer, and time required for changing the color thereof to black was analyzed.

Particularly, each vinyl chloride polymer of Examples 1 to 3 and Comparative Examples 1 to 5 was inserted into an oven at 195° C., and time required for changing the color thereof to black was measured.

2) Dehydrochlorination Amount 10 g of each vinyl chloride polymer of Examples 1 to 3 and Comparative Examples 1 to 5 was injected to a small reactor and was heated to 180° C. The hydrochloric acid thus produced was collected in 200 mL of distilled water and the pH thereof was measured to calculate the amount of hydrochloric acid produced.

3) Generated Amount of Scale

Each vinyl chloride polymer of Examples 1 to 3 and Comparative Examples 1 to 5 was filtered using a 45 mesh, and the amount of impurities did not go through was measured.

TABLE 1

| Division | Thermal stability (min) | Dehydro-chlorination amount (mol/L, ×10⁻⁶) | Generated amount of scale (g) | Polymerization time (min) |
|---|---|---|---|---|
| Example 1 | 18 | 2.1 | 250 | 230 |
| Example 2 | 20 | 2.3 | 200 | 225 |
| Example 3 | 17 | 2.2 | 260 | 230 |
| Comparative Example 1 | 12 | 3.0 | 230 | 230 |
| Comparative Example 2 | 14 | 2.9 | 450 | 330 |
| Comparative Example 3 | 13 | 2.8 | 440 | 320 |
| Comparative Example 4 | 13 | 2.8 | 460 | 330 |
| Comparative Example 5 | 14 | 2.8 | 440 | 350 |

As shown in Table 1, the vinyl chloride polymers of Examples 1 to 3 prepared using a modifier by suspension polymerization according to the present invention have a markedly decreased amount generated of scale, a decreased amount of dehydrochlorination and improved thermal stability (markedly low blackening index) when compared to the vinyl chloride polymers prepared in Comparative Examples 1 to 5.

Particularly, the vinyl chloride polymer of Comparative Example 1 prepared by not adding any modifier suggested in the present invention has similar or somewhat higher amount generated of scale, an increased amount of dehydrochlorination and deteriorated thermal stability when compared to those of the vinyl chloride polymers of Examples 1 to 3.

In addition, the vinyl chloride polymers prepared in Examples 1 to 3 according to the present invention have a decreased amount of dehydrochlorination and better thermal stability when compared to those of the vinyl chloride polymers prepared in Comparative Examples 2 to 5 prepared by adding a modifier when initiating polymerization (at the point when a polymerization conversion ratio was 0%) or at the point when a polymerization conversion ratio was 30%.

The invention claimed is:

1. A method of preparing a vinyl chloride polymer, the method comprising:
    adding 100 parts by weight of a vinyl chloride monomer to a reactor filled with 0.01 to 10 parts by weight of a dispersant, and conducting suspension polymerization at a temperature from 30° C. to 70° C.,
    wherein 0.001 to 10 parts by weight of a modifier is added at a point when a polymerization conversion ratio is 80% or more during the suspension polymerization.

2. The method of preparing a vinyl chloride polymer of claim 1, further comprising drying after the suspension polymerization.

3. The method of preparing a vinyl chloride polymer of claim 1, wherein the modifier is added at a point when a polymerization conversion ratio is from 80% to 95% during the suspension polymerization.

4. The method of preparing a vinyl chloride polymer of claim 1, wherein the modifier is at least one selected from the group consisting of oxycarboxylates, inorganic phosphates and ethylenediamine tetraacetates.

5. The method of preparing a vinyl chloride polymer of claim 4, wherein the oxycarboxylate is citric acid or trisodium citrate.

6. The method of preparing a vinyl chloride polymer of claim 4, wherein the inorganic phosphate is disodium diphosphate or tetrasodium diphosphate.

7. The method of preparing a vinyl chloride polymer of claim 4, wherein the ethylenediamine tetraacetate is disodium ethylenediamine tetraacetate or tetrasodium ethylenediamine tetraacetate.

8. The method of preparing a vinyl chloride polymer of claim 1,
    wherein the modifier is oxycarboxylates, and
    the oxycarboxylate is included in an amount ratio from 0.001 to 1 parts by weight.

9. The method of preparing a vinyl chloride polymer of claim 1,
    wherein the modifier is inorganic phosphates, and
    the inorganic phosphate is included in an amount ratio from 0.001 to 1 parts by weight.

10. The method of preparing a vinyl chloride polymer of claim 1,
    wherein the modifier is ethylenediamine tetraacetates, and
    the ethylenediamine tetraacetate is included in an amount ratio from 0.001 to 1 parts by weight.

11. A vinyl chloride polymer prepared by the method of claim 1.

12. The vinyl chloride polymer of claim 11, wherein the vinyl chloride polymer has an average particle diameter from 120 μm to 180 μm.

* * * * *